(12) United States Patent
Perkins et al.

(10) Patent No.: US 7,702,694 B1
(45) Date of Patent: Apr. 20, 2010

(54) SYSTEM AND METHOD FOR ORGANIZING MANAGING AND ACCESSING LARGE QUANTITIES OF DATA FROM NON-HOMOGENOUS DATA SOURCES

(75) Inventors: Ronald Alan Perkins, Alabaster, AL (US); Darby Elsberry Westfall, Homewood, AL (US); Gregory Lee Sewell, Moody, AL (US)

(73) Assignee: Southern Company Services, Inc., Atlanta, GA (US)

( * ) Notice: Subject to any disclaimer, the term of this patent is extended or adjusted under 35 U.S.C. 154(b) by 326 days.

(21) Appl. No.: 11/851,894

(22) Filed: Sep. 7, 2007

(51) Int. Cl.
*G06F 17/30* (2006.01)
(52) U.S. Cl. .............. 707/790; 707/802; 707/803; 707/809; 709/203; 715/205
(58) Field of Classification Search ............ 707/101, 707/10, 790, 802, 803, 809; 709/220, 204; 705/1, 26; 715/205, 236
See application file for complete search history.

(56) References Cited

U.S. PATENT DOCUMENTS

| | | | |
|---|---|---|---|
| 6,119,149 A | 9/2000 | Notani | |
| 6,240,416 B1 | 5/2001 | Immon et al. | |
| 6,519,568 B1 | 2/2003 | Harvey et al. | |
| 6,640,244 B1 | 10/2003 | Bowman-Amuah | |
| 6,643,652 B2 | 11/2003 | Helgeson et al. | |
| 6,741,982 B2 | 5/2004 | Soderstrom et al. | |
| 6,757,720 B1 | 6/2004 | Weschler, Jr. | |
| 6,871,232 B2 | 3/2005 | Curie et al. | |
| 6,922,685 B2 * | 7/2005 | Greene et al. ............ 707/1 |
| 7,181,493 B2 * | 2/2007 | English et al. ............ 709/204 |
| 7,401,131 B2 * | 7/2008 | Robertson et al. ......... 709/220 |
| 2002/0107699 A1 * | 8/2002 | Rivera et al. ............ 705/1 |

(Continued)

FOREIGN PATENT DOCUMENTS

| JP | 20055293047 | 3/2004 |
|---|---|---|
| JP | 2004126785 | 4/2004 |

OTHER PUBLICATIONS

Crompton et al., BioDA evaluation of the OGSA-DAI middleware, Feb. 2006.*
Handley et al., Datahub science data management in support, Oct. 1993.*

*Primary Examiner*—Jean M Corrielus
(74) *Attorney, Agent, or Firm*—Womble Carlyle Sandridge & Rice, PLLC

(57) ABSTRACT

A method, system, and computer readable medium for organizing, managing, and accessing large quantities of data in a centralized database received from a plurality of non-homogenous data sources. In the method, a specific format is defined for storing the received data in a plurality of data records in the centralized database. A plurality of datasets are created including a definition and a translation for each data item, the plurality of datasets establishing the data that is transferred into or out of the centralized database. The plurality of datasets are stored in the centralized database. A plurality of value tags are created defining a plurality of data formats and database column names to use in importing or exporting data. An inbound interface is created for accepting data from the plurality of non-homogenous data sources wherein the data represent measured values of physical resources. An outbound interface is created for exporting data upon request to an external application.

44 Claims, 10 Drawing Sheets

U.S. PATENT DOCUMENTS

| | | | |
|---|---|---|---|
| 2002/0107752 A1* | 8/2002 | Rivera et al. | 705/26 |
| 2002/0107913 A1* | 8/2002 | Rivera et al. | 709/203 |
| 2002/0147611 A1* | 10/2002 | Greene et al. | 705/1 |
| 2002/0147726 A1* | 10/2002 | Yehia et al. | 707/101 |
| 2002/0165727 A1* | 11/2002 | Greene et al. | 705/1 |
| 2003/0126137 A1 | 7/2003 | McFadden | |
| 2004/0078423 A1 | 4/2004 | Satyavolu et al. | |
| 2005/0015375 A1 | 1/2005 | Harjanto | |
| 2005/0086272 A1 | 4/2005 | Novik et al. | |
| 2005/0216555 A1 | 9/2005 | English et al. | |
| 2005/0234969 A1 | 10/2005 | Mamou et al. | |
| 2006/0004856 A1 | 1/2006 | Shen et al. | |

\* cited by examiner

| Error Check | Configuration | RunTime | Description |
|---|---|---|---|
| Missing Definition Data | √ | | The identifying tags (Resource, Data Category, Source System, Properties) supplied by the source system could not be resolved to a definition. |
| Missing or invalid time on record | | √ | The time for the record was missing or could not be resolved. |
| Missing or invalid time interval | √ | √ | The source system did not provide enough information to resolve the time interval indicated by the data set. Resolution information may be derived from the configuration if not supplied by the source system, depending on the ETL process. |
| Missing Quality Code when default not configured | √ | √ | The supplied record did not have a quality code which could be cross-referenced, or the configuration of the source system in the DataHub did not have a default. |
| Missing UOM on source record | | √ | The supplied record did not have an external Unit of Measure. |
| UOM cannot be cross-referenced | √ | √ | The supplied record had a Unit of Measure which could not be cross-referenced. |
| Duplicate record supplied by source system | | √ | The supplied record matches the most current snapshot for the record in the DataHub and is rejected. This is not an error unto itself, but simply an exercise to minimize the number of rows stored in the DataHub. |
| Record not equivalent to an integer | √ | √ | After the data value is converted according to the Unit of Measure, the resultant value is not in the format of an integer (no decimals). This is inconsistent with the storage mechanism of the DataHub for EnergyData and is rejected. |

FIG. 7A

| Error Type | Actions |
|---|---|
| Configuration | 1. Manually attempt to match identifier tags (Resource, Data Category, Source System, Properties) to a definition.<br>2. If a matching definition cannot be found, create a definition.<br>3. The source system can either re-supply the data or the data can be taken from the suspend table for processing into the DataHub. |
| RunTime | 1. Research the individual record with the source system to determine why the appropriate information was not supplied.<br>2. The source system can either re-supply the data or the data can be taken from the suspend table for processing into the DataHub. |

FIG. 7B

SYSTEM AND METHOD FOR ORGANIZING MANAGING AND ACCESSING LARGE QUANTITIES OF DATA FROM NON-HOMOGENOUS DATA SOURCES

BACKGROUND OF THE INVENTION

The present invention relates generally to data management systems and, more particularly, to platform-independent data structures for organizing, managing and accessing large quantities of data received from numerous non-homogeneous data sources.

Various data transfer schemes are known in the art. Two common examples are point-to-point data transfers and radial staging design. Characteristics of a point-to-point data transfer system include no common monitoring of data transfers, limited data reusability, advanced knowledge of both target and source data systems, fast implementation, limited data snapshot (i.e., point in time) capability, and various tracking and auditing mechanisms.

In a radial staging design system, a staging database is designed as a heap. Characteristics of a radial staging data transfer system include multiple data owners, limited standardization, limited snapshot capability, advanced knowledge of both target and source data systems, and advanced knowledge of staging database. The data staging process imports data as either streams or files, transforms the data, and stages the data for loading into data warehouses, data marts or operational data stores. The data staging process is driven by metadata, including business rules. Metadata is used along with administrative tools to guide data extractions, transformations, archiving and loading of data to target data warehouse and data mart schemas.

Such previous solutions cannot handle the complexity of the multiple data sources and volumes of data, especially when dealing with data from legacy applications. Such solutions require a good deal of manual support, constant re-design when business needs change, and an experienced staff to provide daily maintenance. There is a need for an invention that creates a data structure that is sufficiently flexible to eliminate the continual creation of new schema.

SUMMARY OF THE INVENTION

The invention is directed to a method, system and program product for organizing, managing and accessing large quantities of data, such as metered or measured data, from numerous non-homogeneous data sources. The invention's metadata schemas may also be used as the foundation for extension schemas for business models.

The invention uses a vertical stacking technique with dynamically configured data categories having built in scaling factors. All data is tagged to make it easily manageable. Graphical displays enable the user to understand and manipulate data. The invention uses dynamic code in the database data that is passed along to downstream systems without the need to continually add databases and tables to capture the new and ever-changing data.

Aspects of the invention include, but are not limited to: (1) a reusable/extensible schema; (2) reliance on the use of metadata to describe the data; (3) ability to store and utilize another system's metadata; (4) platform independence; and (5) use of subscription translations to handle inbound and outbound data, which provides a dynamic translation capability.

Another aspect of the invention is the provision of an abstraction layer between applications and databases to reduce application-to-application and database-to-database dependencies in order to facilitate application and database changes. The invention provides for the insulation of data changes. The invention is operative with common database servers by updating the way in which the data enters and is stored in the database. This capability makes the invention platform independent.

In one aspect of the invention, a method, system, and computer readable medium are provided for organizing, managing, and accessing large quantities of data in a centralized database received from a plurality of non-homogenous data sources. In the method a specific format is defined for storing the received data in a plurality of data records in the centralized database. A plurality of datasets are created including a definition and a translation for each data item, the plurality of datasets establishing the data that is transferred into or out of the centralized database. The plurality of datasets are stored in the centralized database. A plurality of value tags are created defining a plurality of data formats and database column names to use in importing or exporting data. An inbound interface is created for accepting data from the plurality of non-homogenous data sources wherein the data represent measured values of physical resources. An outbound interface is created for exporting data upon request to an external application. The system includes components operating on a computer processor for executing the steps of the method. The computer readable medium contains program instructions that enable the steps of the method when executed on a computer system.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 7A provides an exemplary list of error checks in the inbound interface for DataHub.

FIG. 7B provides an exemplary list of actions based on error type.

DETAILED DESCRIPTION OF THE INVENTION

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Figure 1:
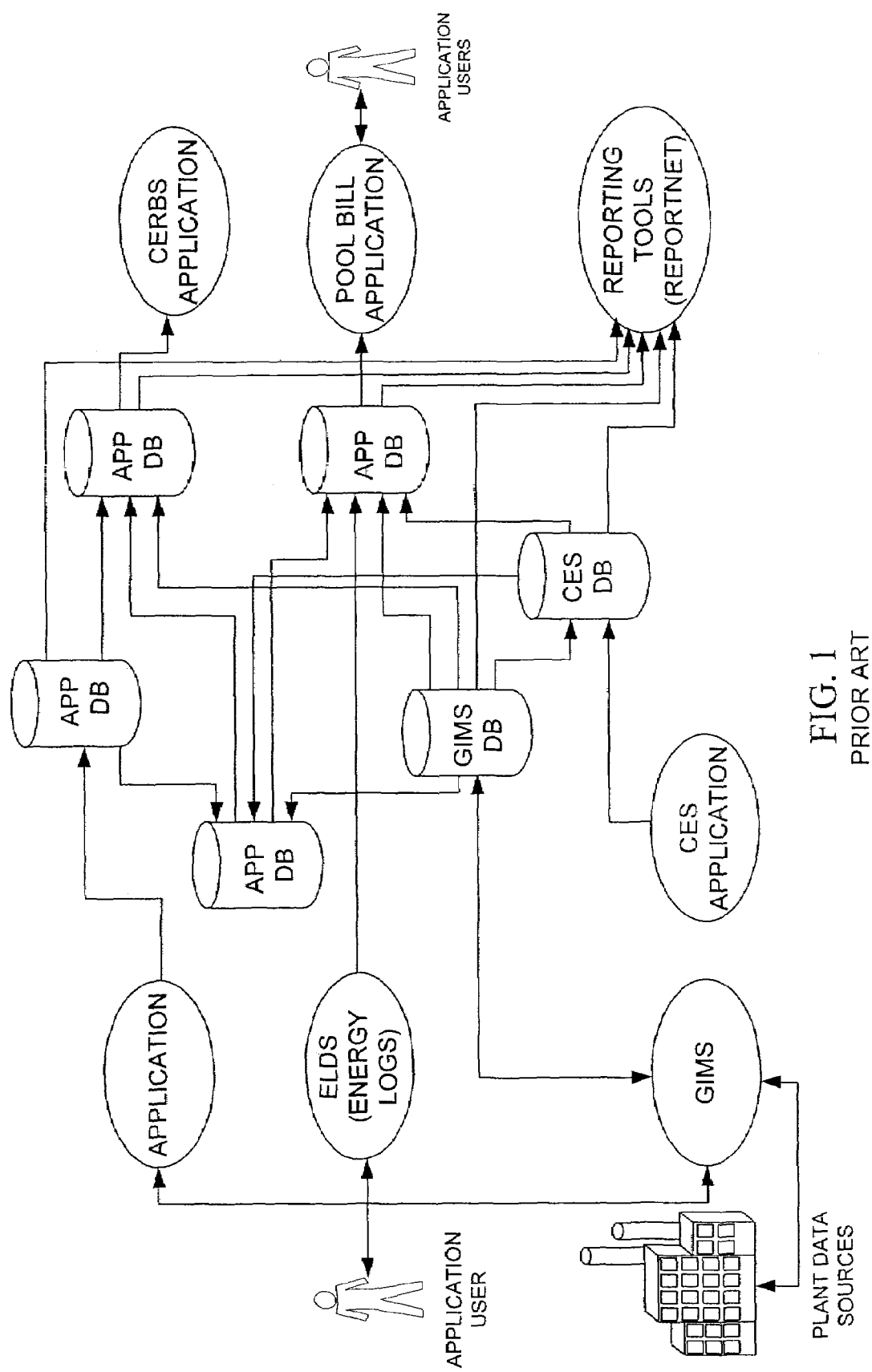
FIG. 1 illustrates an exemplary prior art implementation of point-to-point data transfer for an electrical utility.
Figure 2:
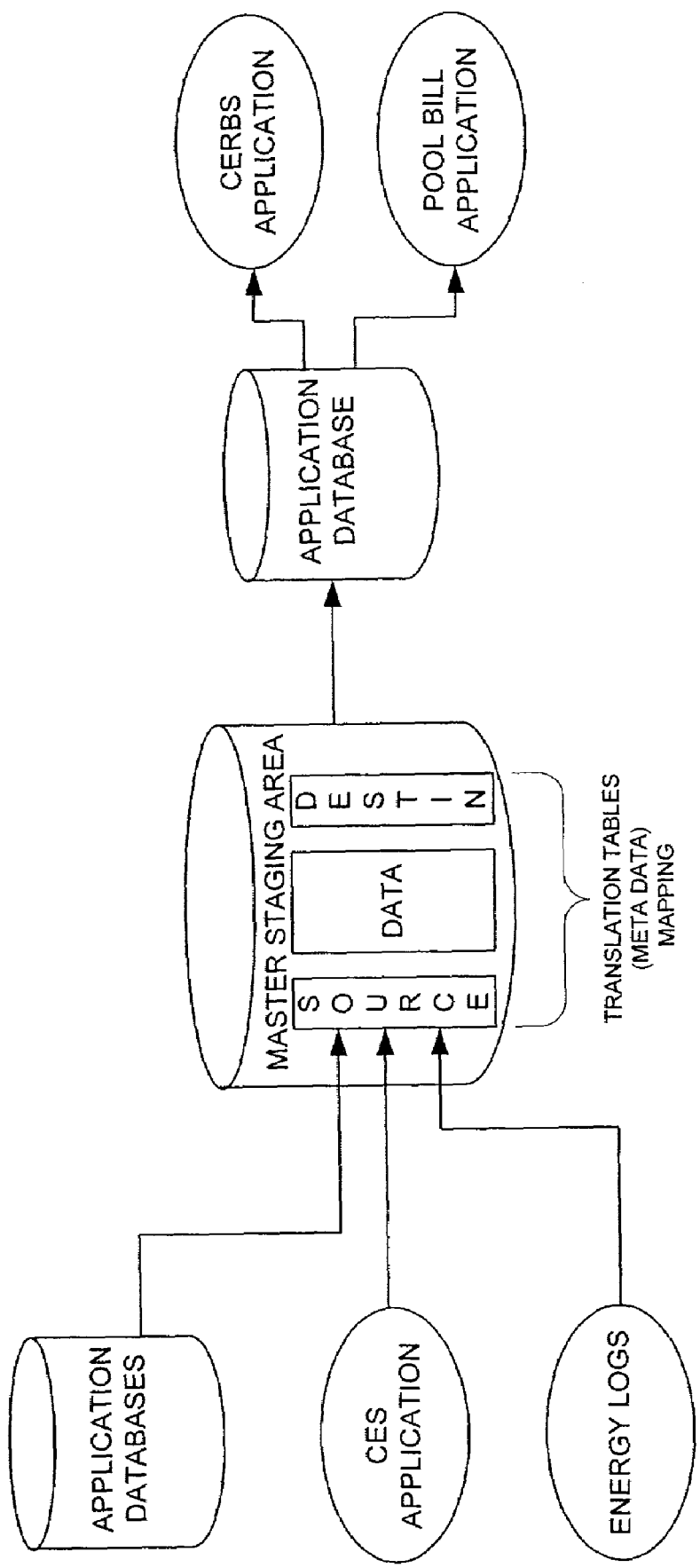
FIG. 2 illustrates an exemplary prior art implementation of radial staging data transfer for an electrical utility.

FIG. 1 illustrates an exemplary prior art implementation of point-to-point data transfer for an electrical utility. FIG. 2 illustrates an exemplary prior art implementation of radial staging data transfer for an electrical utility.

Figure 3:
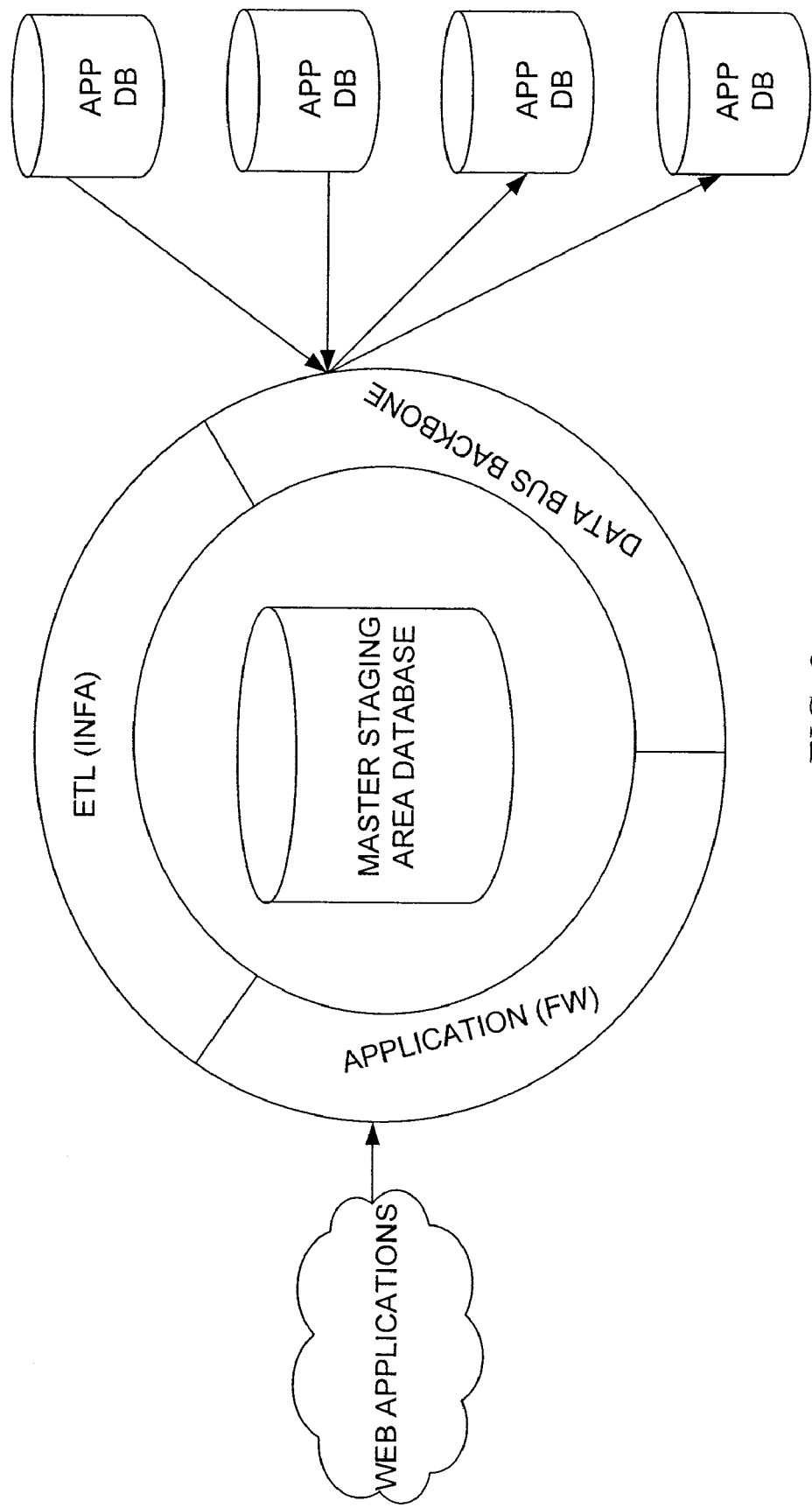
FIG. 3 illustrates an exemplary hub and spoke design scheme used in an implementation of an exemplary embodiment of the invention.

As illustrated in FIG. 3, the invention includes a hub and spoke data transfer design scheme, which is referred to herein as DataHub as a short name for the inventive system. The DataHub database is the centralized hub for data and the cornerstone of data interaction and data movement. The primary "users" are applications and data transfers. If data is needed, used by more than one system, or if there is an external system sending data, the data will go through the DataHub system. The DataHub system can accept all inbound data and store it without information loss. The DataHub system can transmit all data back in the same format in which it was received. The DataHub system can translate all data into a standard information technology (IT) format for a department of the enterprise and application specific-formatted data, including time position (hour ending/hour beginning), data format, and units of measure.

Figure 4:
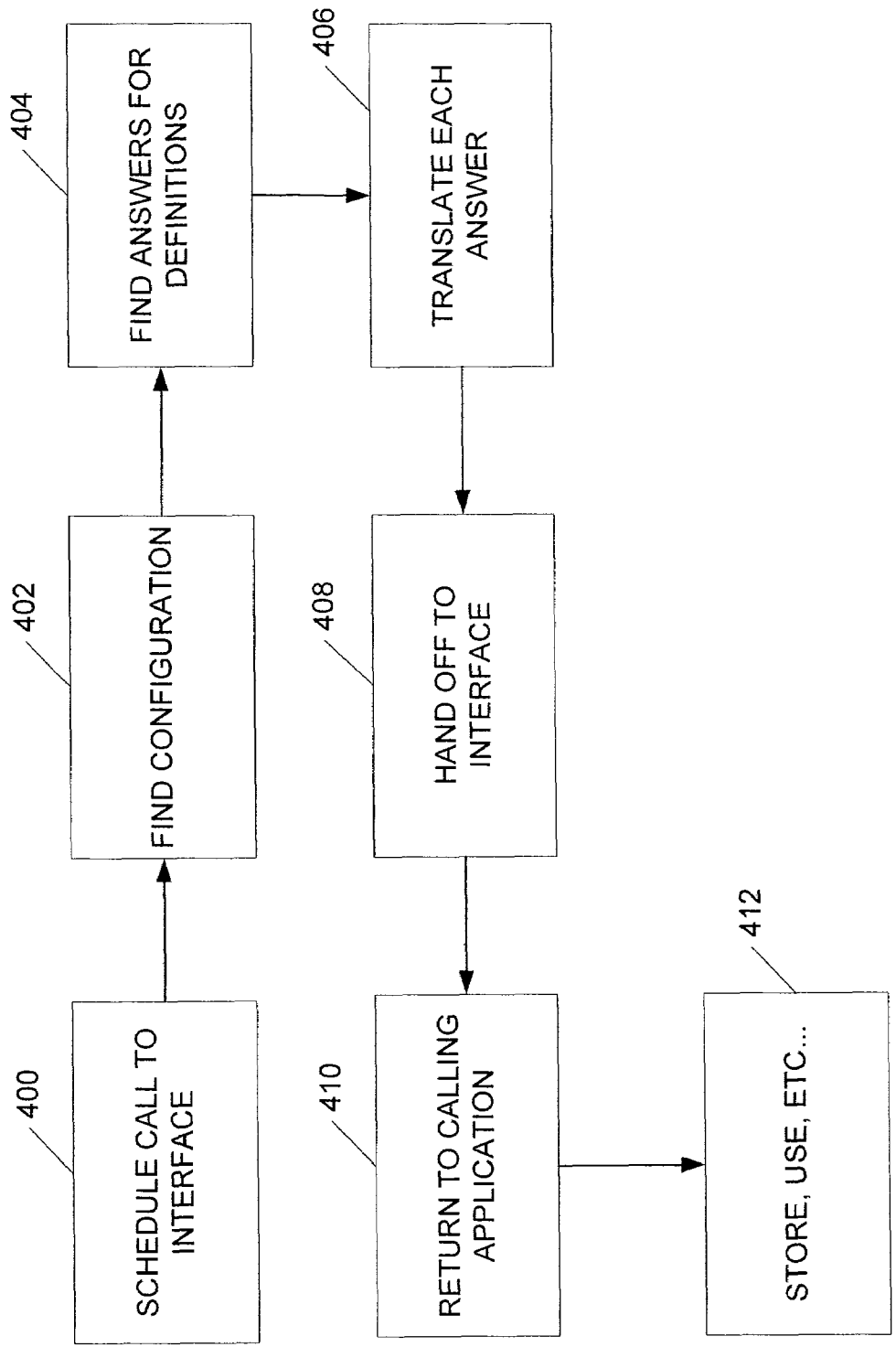
FIG. 4 illustrates exemplary high-level processing logic for the DataHub system.

FIG. 4 illustrates exemplary high-level processing logic for the DataHub system. Processing starts in step 400 with scheduling a call to an interface. In step 402, the configuration is found. This is followed in step 404 with the determination of answers for the definitions. Each answer is translated in step 406. Next, in step 408, there is a handoff to the interface. A return to the calling application is done in step 410. Then, in step 412, the returned data is stored, used in the application, etc.

The DataHub system provides data to data consumers in two different formats: vertical stack and horizontal pivot, as exemplified in the following table:

TABLE 1

| Vertical Stack | | |
|---|---|---|
| KEY | DT | VALUE |
| Unit 1 | NetGen | 100 |
| Unit 1 | GrossGen | 125 |
| Unit 1 | StationServ | 25 |

| Horizontal Pivot | | | |
|---|---|---|---|
| Key | NetGen | GrossGen | Station Service |
| Unit 1 | 100 | 125 | 25 |

The DataHub should be able to accept new categories of data with few, if any, design changes. For example, the DataHub system might receive 20 pieces of data in one day on Unit 1, which require minimal or no changes to the DataHub database design. Receiving additional data should be a simple registration process instead of requiring a DataHub database design change.

The DataHub system includes a user interface (GUI) to control its configuration. Auditing controls for data requests and transfers must be in place.

The DataHub system includes the ability to accommodate time changes. The DataHub also handles time zone conversions. The DataHub system further allows for requests for data as it existed at a specified point in time, and is able to provide data for any past hour.

The DataHub system includes a mechanism to configure data retention policies by data type and application. An application must provide a generic interface to retrieve data by time range for registered data sets.

The DataHub database can be thought of in terms of having a "left" side (definition side) and a "right" side (translation side). On the left side, the data can be viewed in the DataHub standard format. This format may differ from the way a specific system sees data. On the right side of the DataHub, the data is in the format recognizable to its native system, or the system calling or providing the data.

When a user requests a dataset, he must enter the name of his system (e.g., pool billing) and the dataset being requested. When this dataset is entered into the DataHub database, the DataHub database does not "know" what the pieces of the dataset are, but retrieves them without having to know. The DataHub will simply get the information that is requested without using database processing logic. The user tells the DataHub how his system needs to receive the dataset (e.g., KW versus MW) and the DataHub database provides it to the user in the way he wants to see it. The DataHub system knows how the given system needs to see the data based on what was selected on the user interface Application System Maintenance Screen.

DataHub Datasets

There are several principles which are used in the design and development of datasets for DataHub. As used herein, the term dataset refers to the complete definition/translation combination for each piece of data. The limit of the dataset is to the interface boundary between two systems for the purpose of data transfer, and not the internal processing of the target system. The DataHub has been designed primarily to be a source to external systems through interfaces that are built or configured to the needs of the customer application. This allows for the considerations in the following paragraphs.

The dataset should not be built as all encompassing for the system, but instead, should be built to supplement existing functions. For example, if the transfer of data to a table can be accomplished using a single function, then the transfer of data to this table should allow the use of a single dataset. However, other systems using the same amount of data may consume that data in n number of functions. To accommodate this, multiple datasets should be created corresponding to the data content required by the functions individually.

The interface boundary occurs at the business layer, which controls processing and directs access to application databases. This means that evaluation processes are not a consideration of the DataHub dataset, such as use of the data according to the sign of the value.

The content of the dataset should be minimized according to the following rules:

1. Only send what the function consumes.
2. If possible, use the selection of the content as an aid in removing downstream configuration tables. For example, instead of a flag to determine which record to take into a function, the dataset should only be populated with the content required to support a given flag setting.

3. At all times, the contents of the dataset should not cause new configuration tables to be created downstream solely to aid in the processing of the dataset, unless the tables have additional functional value to the application system.

The dataset can be used to allow for new changes to an application system, but should not force these changes downstream. The DataHub interfaces allow for multiple formats of data. It is only necessary to configure one format for a dataset to an interface. The application system interfaces and the DataHub components, interfaces and datasets should not be forced to accommodate more than a single format, except where no available format is sufficient.

The DataHub uses the concept of a definition for data values rather than a data point. The important distinction between the two is that the definition includes more information per record concerning how the data value was created. Most interface boundaries to existing systems will use the concept of a data point over a definition. However, the how portion of the definition can be used in the selection criteria for the contents of a data point.

In the development of a dataset, there are several considerations to be made, most of which involve the translation aspect of the data. A primary consideration for all factors is that the output from the DataHub interfaces has to be recognized as unique per row by the interface and not necessarily by the target system. These factors include aliases, content and interfaces.

An important aspect of the translation is the registered aliases for the application system in the DataHub. Aliases are used to replace nearly all of the fields in a data point, usually for the resource and data category. The creation of aliases is based on the application system identifiers. This is usually all-inclusive. If the aliases for the system do not allow the individual functional datasets to have unique data in the output, the choices outlined in the following paragraphs can be used.

The content or scope of the dataset can be limited. If the content of the dataset is such that the output is not unique according to the selected format, the ability of the target function should be reanalyzed to understand how it currently manages records which are not unique, and a new format should be used or a new dataset should be constructed.

It could be considered if the target function is truly part of the identified and registered application system. Some functions may support more than one target system, each of which uses varying identifiers. In this case, the function may require registration as a new individual application system, or configuration under a different, existing application system.

As a last resort, additional aliases may be required that the interface understands, and which can be resolved prior to acceptance by the target system. This would normally involve "hidden" code or additional configuration tables, so this step is discouraged unless the change can bring added new value to the target system.

The content selected should adhere to the following guidelines:

1. Reassignment of data points should be accomplished in the dataset when possible.
2. The content should never exceed the ability of the target function to consume the data without the application of filters or additional configuration tables used solely for the purpose of the interface.
3. The use of an external dataset should be considered to contain the appropriate identifiers required for the function to consume a data transfer dataset. One dataset is used to transfer the data, and the other to control its processing. The general idea is that an external dataset does not normally transfer data to or from the DataHub, but its configuration is accessed for the purpose of controlling a non-DataHub function, such as a report requiring translation between two external systems.

The interfaces of either the DataHub system or the target system may require changes to accommodate the transfer of data. This could be the requirement for a new format, new fields, or new processing capability.

DataHub Dataset Views

For each dataset, the DataHub creates a definition/translation combination. There are two resolve matrix views within the DataHub; the output of these views is the definition/translation of a dataset. In an exemplary embodiment, view names should begin with v_ (underscore). The two resolve matrix views within the DataHub are:

1. Human readable, e.g., v_DisplayDataSetInformation;
2. Machine readable, e.g., v_DataSetTranslate.

Every inbound and outbound interface uses one or both of these views depending on what is being accomplished.

Each dataset combination (definition/translation) is "owned" by a system, but only in the form of being the originator of the dataset. When the original owner no longer uses the dataset, ownership is passed to the second system that subscribed to the dataset. Ownership of a dataset continues to pass in that hierarchical manner as systems unsubscribe to a dataset.

Since datasets can be reused, it can not be owned by one system; therefore, a given system must subscribe to it. A dataset is used to define what is transferred into or out of the DataHub. Datasets are owned by the system administrator.

Filter Criteria

DataSetDefinition filters help the user to find a definition to add to the data set. On the definition screen, these would also be the same filters that allow the user to browse definitions in general.

1. Resource—Short Name, ID, Resource Type (Group or Code)
2. DataCategory—DataCategory, BaseDataCategory (Group or Code)
3. SourceSystem—SystemName
4. Element—ElementType (Group or Code), individual elements or in combination ResourceXref filters help the user to find a value tag and a resource to cross-reference. Value tags and resource cross-referencing are discussed in subsequent sections. These filters, plus a filter on XrefType would allow the user to browse cross-references in general.

1. Resource—Short Name, ID, Resource Type (Group or Code)
2. SourceSystem—SystemName
3. Value Tag—TagCode, LongName, Type (Group or Code) Subscription Translation filters help the user to isolate individual fields.
1. Subscription—should be a selector that shows the names of the data sets
2. Definition—see DataSetDefinition above
3. AppValueTagID
   a. SourceSystem—SystemName
   b. Value Tag—TagCode, LongName, Type (Group or Code)
4. AppResourcetagID
   a. SourceSystem—SystemName
   b. Value Tag—TagCode, LongName, Type (Group or Code)
5. UOMTypeID—Type (Group or Code)

6. Element—the matrix that has all the check boxes similar to EnergyDataDefinition would be a good idea here.

7. TimeBasisTypeID—Type (Group or Code)

ResourceAssoc filters help the user to find resources to cross-reference. These filters, plus a filter on AssociationType would allow the user to browse cross-references in general.

1. Resource—Short Name, ID, Resource Type (Group or Code)

Value Tags

The DataHub is completely dependent on the end user configuring the system to function. It is the responsibility of the administrator to ensure the proper types and tags are used. Each system will have value tags that define much of the data formats and column names that will be used in importing or exporting data. Value tags are groups of tabs that label data. Data value can be any kind of data. The value tag is internal to the DataHub database. There are two types of value tags: (1) system/mechanism tags, and (2) aliases. System/mechanism tags provide a quick title to describe what has been done. As functions (i.e., code sets) are written, there may be a need for markers of what has been performed. Regarding the second type of tag, systems may use many names for the same thing. An alias is used in the definition/translation combination.

Certain requested functions could be dependent on the tags that may or may not be present. For example, if a request is made to pivot data values horizontally (data categories represented as column names), then the column name must be in the ObjectAffected field of the tag. Likewise, if a data category is actually to be returned then a value tag for the column name where data categories are provided must be created.

To find the correct value tag for a certain function, the type (representing the type group and type code) is used, and not a specific value tag itself. For example, system A would create a value tag of the type "Default Column: Data Category." The actual tag code could be "Column2." The DataHub interfaces would search on the type to find the correct value for system A, and use the value "Column2" as its column name.

Resource Cross-Referencing

The resource cross-reference (ResourceXref) table is designed to be a cross-reference between a valid DataHub resource and the equivalent resource tag of an external system. The DataHub resource can be mapped only once to an equivalent resource per system. This rule exists as a given system can only know its resources uniquely. A physical entity may exist in a given system multiple times, but generally, the tags will be different. For example, Unit 6 could be a physical asset of an energy company. However, it can be mapped in a given system as Unit 6 and Unit CC #6. In this case, there are two equivalent system resources.

Composite Flags

In certain instances, the following rules will apply:
1. the resource cannot be uniquely identified from the data available, separate from its measurements or other data;
2. the external system requires a single DataHub resource to be mapped to one or more of the resources of the external system for any reason.

When these rules are applicable, the composite flag is set to "Y". The processing of a composite flag is simply against the data definition record, which is a combination of resource and data category. The processing is not significantly different, other than the ResourceXref table being bypassed for mapping information. However, the functionality introduced is significantly increased, by allowing the DataHub to meet the rules listed above.

DataHub Data Inheritance

Data inheritance in DataHub is limited to the idea that a certain data tag can be copied or used in place of another, without action by a user. Other aspects of inheritance, such as polymorphism, are not included in DataHub.

The ability of external application systems to use the data available in the DataHub database is normally dependent on explicit configurations entered by the administrator. However, it would be a waste of resources to require translations for everything used in the transfer or usage of data. For example, if a requesting system uses the same unit of measure as the DataHub database for each of the requested data points, then the administrator should not be required to create a translation to that effect.

However, the use of inheritance must be limited in its scope by functional rules to avoid misinterpretation. For example, it would not be a good idea to allow resource identifiers to be inherited between the DataHub and an external system, unless the external system was designed in such a way that inheritance is acceptable. The DataHub might place an identifier of "10" on a record and send it to the requesting system. The DataHub intended for the "10" to represent a resource called "Blue". However, the external system has an identifier of "10" representing a source called "Red". In this case, the data values for "Blue" would be incorrectly posted to "Red" in the external system.

To allow for limited, or mixed, inheritance, certain rules and categorizations must be in effect. The data inheritance of the DataHub system is defined in three categories.

Level 1

This category is inclusive of any identifier required to uniquely identify data, such that by altering a given identifier, the assignment of the attributes or values from a record to the identifier would be incorrect in relation to the expected assignment. This category covers ResourceID, DataCategoryID and potentially other identifiers, such as QualityCodes.

Level 2

This category is inclusive of any identifiers which may cause the data value of a record to be significantly altered, such that the final value is not the expected value. This category covers units of measure conversions, time basis/zone conversions, and potentially other identifiers.

Level 3

This category is inclusive of any identifier which would normally result in a technical error that does not affect the assignment of values or significantly alter the data values. This category covers Column Names and potentially other identifiers, such as DataTypes.

External or requesting systems are also classified into two categories.

Foreign or Alien System

This categorization is inclusive of all systems whose data and functionality were not specifically created for association to the DataHub. Generally, these are legacy systems whose identifiers for resources, measurements, or other entities will be pre-defined, and different from the DataHub.

Extension or Compatible System

This categorization is inclusive of all systems whose data and functionality were specifically created for, or modified to work with, the DataHub. Generally, these systems are newer than the DataHub system whose identifiers for resources, measurements, or other entities are such that they are definable in accordance with, or able to be cross-referenced to, the DataHub.

Level 1 inheritance is not available to foreign or alien systems, but is available to extension or compatible systems. This carries significant impact on those systems that desire to use partial data definitions in a way that provides all data values regardless of whether or not the system has the appropriate configurations. For example, to have a partial definition for "Temperature" will not result in all resources having a temperature measurement being returned to the external system. Only the values for the mapped resources will be returned.

Level 2 and Level 3 inheritance is available to all systems. It is the responsibility of the system configuration expert to understand the potential implications of Level 2 and Level 3 inheritance in the translation configuration process.

Column Naming Options in the DataHub

In addition to being able to translate any given code from the DataHub standard format to the requesting system format, the DataHub system must be able to provide data in the original column names and data types used by the requesting system. The DataHub system provides several methods by which this can be accomplished. The use of a given method depends on which interface is called. Generally, the usage can be defined as described in the following paragraphs.

When the data categories are pivoted to a horizontal data stack, only one resource identifier column is identified and the translations are complete. In this case, both the data categories and the resource column names are represented by the value contained in the ValueTagList.ObjectAffected or SubscriptionTranslation.ColumnName field. The latter has precedence. The time column name is the record in the ValueTagList table under the Default Column types applicable to the application system.

When the data categories are not pivoted (vertical data stack), the translations are complete, and the requesting system uses its own column names, all column names are taken from the records in the ValueTagList table under the Default Column types applicable to the application system. The data type for the Data Category column is taken from the record in the ValueTagList for Application Default: Datatype.

When the data categories are not pivoted (vertical data stack), the translations are complete, and the requesting system uses the DataHub column names, all column names are taken from the records in the ValueTagList table under the Default Column types applicable to the DataHub system.

Column Names as Records in the ValueTagList Table

All application systems should maintain a set of records in the ValueTagList table with default column name values. At a minimum, there should be a record for each of the following type codes.
 1. Default Column: Data Category
 2. Default Column: Data Value
 3. Default Column: Quality Code
 4. Default Column: Record Time
 5. Default Column: Resource In addition, a Value Tag record should be created for the default datatype of the application under the Type Code: Application Default: Datatype. This record is used for the Data Category column export when more than one data category is present in the column.

DataHub Default Datatypes

When the DataHub format is acceptable, the columns in the interface will always be exported using the following datatypes.
 1. TimeStampUTC—datetime
 2. Resource Tag—string
 3. Data Category Tag—string
 4. Data Value—integer
 5. Quality Code—string DataHub Inbound Interface Specifications When accepting data from another system, the DataHub inbound interface expects all data to be passed in the correct format as strings. If the source system cannot directly create the data as strings, then the intermediate bridge built to support the data movement is responsible for doing so.

The inbound interface is designed to pass a data point. A data point is the data value associated with a measurement and the assignment of the measurement to a resource, such as a unit.

System Resource Tag Code

This code is used to identify the resource in the source system. Generally, this will be a common identifier, such as the UnitID, PlantID, meterID, or other resource identifier. A resource in this context is the object to which the data measurement is applicable. The code must match the Value Tag Code (alias) created in the DataHub database during the data configuration work.

Resource Type

This code is used to identify the type of resource being passed. This field must match the Value Tag Code Type (alias type) created in the DataHub database during the configuration work.

This code helps to segregate identifiers. For example, in a source system, both a Unit and a Plant may share the same code of 010. In order to distinguish the datapoint records, the Resource Type would either be Unit or Plant as appropriate to the record being passed.

System Data Category Tag Code

This code is used to identify the measurement being passed. This field must match the Value Tag Code Type (subscription translation) created in the DataHub database during the configuration work.

For example, the source system knows a particular measurement of Breaker Position (bpos). The bpos code is registered with the DataHub system as a data category of the source system, and the bpos will be the code passed in this field for a datapoint about Breaker Position.

System Tag Composite Flag

This code is used to identify when a source system does not contain explicit identifiers for Resources and Data Categories. If only a datapoint can be known, then this flag is set to "Y", otherwise, default is set to "N". This code is registered per datapoint in the Subscription Translation in the DataHub, and must match.

Record Date/Time

The date time of the record. For example, if the record is intended to be the top of the hour, then this field is the top of the hour for which the record is applicable. This field is not to be confused with the Time Last Updated field.

Record Unit of Measure

The unit of measure (UOM) code of the record. The code must be registered as a Value Tag Code of the UOM type in the DataHub, and a cross reference must exist. For example, the code of "KW" would be used here to indicate Kilowatts.

Record Quality Code

If applicable, the quality code for the record. If a quality code is not applicable, then the default code of the system should be passed.

Record Data Value

This field is for the value of the measurement for the datapoint. The value should be in the final format of the answer. For example, if the record is a decimal, then the string format should be read as a decimal, such as, 125.34.

Column Name

This field is for a column name. The column name is used when a datapoint record has to be pivoted (i.e., the datapoint record contains more than one value in two different columns. The column name must be registered on the Subscription Translation in the DataHub system, or as appropriate according to the inheritance rules of the DataHub system.

Time Last Updated

The Time Last Updated (TLU) is not actually passed to the DataHub system, only the data movement bridge. The value is used in the selection criteria for retrieving data from the source system. The TLU in the source system should be either the time the record was created in the system, or the time of the last update to the system. The TLU is remembered by the data movement bridge, increasing with each run.

Datapoint Reassignment

It is sometimes necessary to reassign a datapoint (definition) in a data stream. This is usually for one of two reasons: (1) the datapoint is being reassigned from one resource to another; or (2) the datapoint is being reassigned from one data category to another.

This reassignment can be interpreted as a temporary or single instance type and follows the following guidelines in the DataHub system.

1. The rule that any two systems must agree, in the interface, to know a resource in only one way and share a single translation between the resources. This rule does not state that any given system must know a resource in a single way, only that in the bridge interface that it is known only one way. The reassignment may only be valid for a given subscription.
2. The reassignment is accomplished in the following manner for a resource.
   a. The external resource tag is created in the ValueTagList table.
   b. The external resource tag is assigned a valid DataHub resource in the resource cross reference.
   c. The ReassignCount field in the Subscription Translation is set to greater than zero. This indicates that the record exists for a reassignment. The setting of the value in this field is controlled solely through the maintenance GUI.
   d. The CompositeFlag is set to control whether or not the override value is inherited.

Since the user has the chance to override any given field in the record, such as the AppValueTagID, then all other overrides are done simply via the record in place.

The resolution views use the following logic to determine the proper external resource to use:

1. When ReassignCount=0, the external resource is inherited from the ResourceXref entry.
2. When ReassignCount>0 and the CompositeFlag='N', the external resource is inherited from the ResourceXref entry.
3. When ReassignCount>0 and the CompositeFlag='0', the external resource is read directly from the record and the corresponding ValueTagList record.

The Composite Flag of "Y" is not affected by this logic as these records bypass all inheritance of resource, and simply assign the data category to the resource. The ReassignCount can still be used to show reassignment of datapoints.

Batch Loading in DataHub for Metadata

In order to facilitate the capture of metadata, the DataHub system allows for importing data tags from spreadsheets. The Resource, Value Tags, Types and Applications table can all be populated via this batch loading process. Templates for these are available from within the application by choosing the desired table and clicking the template button.

Additionally, these tables can be exported to spreadsheets, enabling rapid updating of metadata.

Time Management Resolution

Part of the time management resolution process includes time zone resolution, time basis resolution and time interval resolution. The DataHub is always Universal Time Coordinated (UTC-GMT). UTC is a high precision, atomic time that closely tracks Universal Time (UT). UTC is often referred to as Greenwich Mean Time (GMT) when describing time zones although UTC only approximates GMT as certain countries have variable GMT programs.

Regarding time zones, applications must tell the DataHub system the time zone the applications are in on a per subscription basis. Time basis (i.e., beginning, end, neutral) is provided on a per definition/translation level, with one time interval request per dataset. Time interval has no functional basis in the interfaces other than storage.

Any column with "internal" in it is strictly used for the DataHub system in the definition side; "external" would be used for the translation. "Internal" is always fully defined (or cannot be translated). On the external side, if information is not in a subscription, it is assumed to conform to DataHub standards. A user configures his subscription to a dataset. The Properties table helps to refine the definition of the dataset.

Date Management in the DataHub

Effective dates and end dates are used extensively in the DataHub system as a means of controlling use and access. In configuration tables, the effective date marks the first date the record is accessible in order to have data stored against it. It also marks the first date for which child configuration records can be set. At all times, the effective date, and subsequent child configuration records, can be set to the future.

The effective/end dates in the DataHub system are values intended for the record value for the row (i.e., the row as a placeholder), and not for the row itself. For example, tag ID 10 is created with a code of "Alpha". The effective date then is when tag ID 10 is in effect, and not the code itself. If the code changes, the changed value is kept in the record, and the original value placed in the audit tables.

This is applicable to all records in all tables, regardless of whether or not the record is a foreign key to other tables. For example, the defaults for application systems are stand-alone values in the value tag. The rules above are still applicable.

At any time, when the placeholder is no longer in effect, the record end date is set. It is the responsibility of the GUI and maintenance procedures, or the database administrator (DBA), to ensure that cascading of the foreign key occurs.

For configuration resolve at runtime, the resolution process will only analyze the tables at the highest end of the hierarchy, and is not required to traverse lower order tables. For example, in resolving a definition, the DataDefinition effective/end dates would be used, and not the individual tables providing foreign keys, except as required. This is achievable since the setting of an end date for a lower order table should have resulted in the expiration of the data definition containing that record's key.

The following are the rules that are applicable for effective date:
1. When data is received prior to a record's effective date, the DataHub must mark all data received via data transfer in error and suspend the record.
2. An effective date can be set in the future, and all subsequent child records can be set to a date that is equal to or greater than the parent's effective date.
3. An effective date can be changed to a date that is earlier than its original value, and no cascade of the date is required.
4. An effective date can be changed to a date that is later than its original value, only if the following is true:
    a. No data has been received for the record which will be earlier than the new date. If this case exists, the data must be archived out of the DataHub answer tables.
    b. No child configuration records exist with an effective date earlier than the new date of the parent. The rules for cascade events described below provide more resolution.

The following are the rules that are applicable for end date:
1. When data is received after a record's end date, the DataHub must mark all data received via data transfer in error and suspend the record.
2. An end date can be set in the future, and all subsequent child records can be set to a date that is equal to or greater than the parent's end date. These records are considered to be disabled for activity past the end date, even if the current date is less than the end date.
3. An end date can be changed to a date that is later than its original value, and no cascade of the date is required.
4. An effective date can be changed to a date that is less than its original value, only if the following is true:
    a. No data has been received for the record which will be later than the new date. If this case exists, the data must be archived out of the DataHub answer tables.
    b. No child configuration records exist with an effective date later than the new date of the parent. The rules for cascade events described below provide more resolution.

Date changes require a cascade event to occur to ensure consistency with the child records. This cascade cannot be managed in the stored procedures, as the procedure cannot interpret the intent of the user. Therefore, the application will control the cascade events for date changes.

The maintenance stored procedures are modified to incorporate cascading of end dates to foreign key tables downstream of the affected table. Since the procedure cannot interpret user intent, nor can the procedure remember values concerning unaffected records, there will be no "Undo" feature. The GUI will warn the user with statistics and values, but once the user accepts the change, the change will be considered permanent.

The following general rules are used in cascading.
1. All downstream records using the expired record will have their end date set to equal the end date of the affected record if the downstream record end date is null or greater than the end date of the record (i.e., the end date in the future will be reset to the end date of the expired record).
2. Cascaded records will not cause changes to records higher in the hierarchy.
3. Stand-alone records required as system defaults cannot be expired.

Effective dates can be used in the future to show that a record value is to come into effect. The maintenance procedures will be modified to ensure that the foreign key values used are appropriately date ranged. For example, a value tag used in a resource cross reference will not be available for that usage prior to the value tag's effective date.

DataHub Data Retention and Archive Policy

In an exemplary embodiment, the DataHub system allows for data retention and archive policies to be established for energy data. The policies are established for the data records using the data category as its primary focus. Policies can also be established for the resource or the time interval, or any combination thereof.

Figure 5:
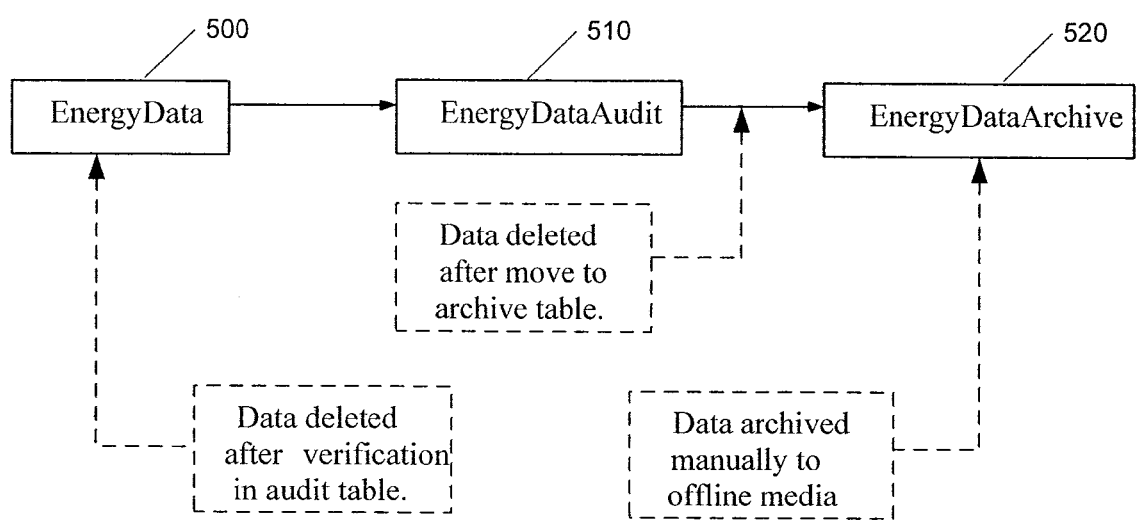
FIG. 5 illustrates a data retention and archive policy in accordance with an exemplary embodiment of the invention.

The retention policy for energy data depicted in FIG. 5 follows a positive process. In other words, data will always be retained, except as explicitly defined in the policy. This applies to the automated process, but does not preclude manual intervention to remove data. Data is only archived from the audit tables 510. Data is removed from the tip tables 500, but only after positive verification that the data record is in the audit table 510.

Data will only be archived by the DataHub automated processes, and not removed to tape or other media. Archive tables 520 will be provided for each data extension series to ensure this requirement. After the data is archived, it can be removed from the audit tables.

Data can be selected to be removed from the tip 500 or audit tables 510 on differing policies. This is useful in that the tip table 500 is designed to be the most recent data, and the audit tables 510 the complete snapshot. It might be desirable to have the tip table archived using a more rapid archive in order to maintain performance.

The policy records are set by indicating the total number of days that the data is to be retained. There are three retention values: (1) tip retention—data will be maintained in the tip table 500 for this duration prior to removal; (2) audit retention—data will be maintained in the audit table 510 for this duration prior to archiving; and (3) archive retention—data will be maintained in the archive table 520 for this duration. Though an automated process will not use this value, manual processes should be guided by it.

The archive table 520 is searchable, but is never to be indexed or have constraints applied to it. Indexes should be minimized on this table to ensure performance of inserting records into it. The archive table 520 does not carry constraints to ensure that all data is captured, and cannot error out. It is important that the archive portion of the process be extremely accurate in its delivery of data to this table.

The data retention policies are resolved using the following archiving procedures:
1. If an explicit record cannot be found in the EnergyDataRetention table that matches any combination of Data Category, Resource or Time Interval, the data is retained.
2. If a record is found having only the Data Category field populated, then all records will be removed having that data category, except when another record having the same data category but other fields and a longer time span are found. Consider the following example. Record 1 in the EnergyDataRetention table has a Data Category of 89, no other identifying fields populated, and an audit retention of 365 days. Record 2 has a Data Category of 89, a Resource of 50, and an audit retention of 500 days. Assuming no other records exist for this data category, and that no other records exist for the resource or time interval listed on each record, all data records having Data Category 89 will be removed when aged to 365 days, except for those whose Resource is 50. These records will be removed at 500 days.

3. The Time Interval field can only be used to further define a retention policy for energy data. It cannot be used to set a full policy in and of itself.

Data Hub Data Movement Audit Process

Figure 6A:
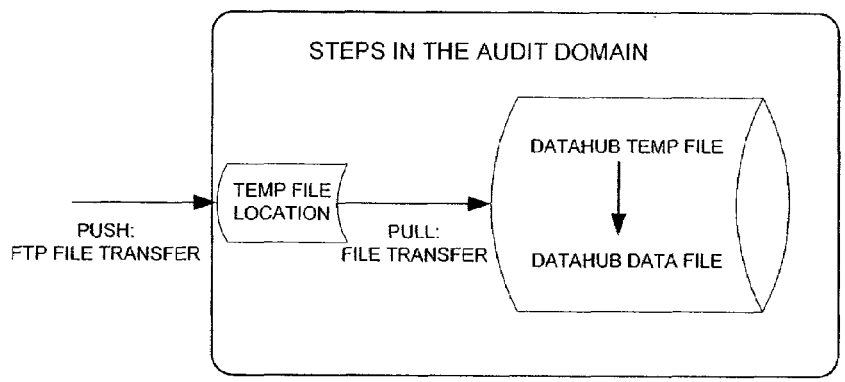
FIG. 6A illustrates the steps in the audit domain for an exemplary inbound push/pull file transfer.
Figure 6B:
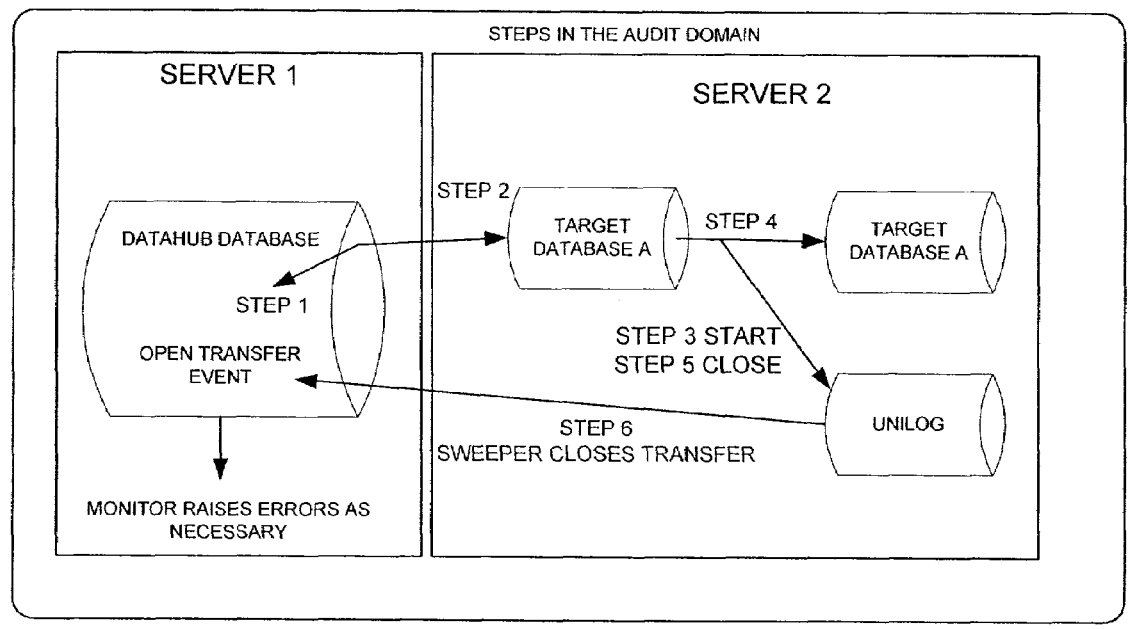
FIG. 6B illustrates the system in the audit domain for an exemplary cross-server outbound transfer.

The DataHub is a repository for data. Data is transferred in and out of the DataHub via inbound and outbound subscriptions. A subscription defines the set of data that is the target of the inbound or outbound transfer. Every data transfer event will be registered to the DataHub system for auditing purposes. The following outlines the processes that are required with every inbound or outbound data transfer. Additionally, the process is graphically represented in FIGS. 6A-6B. FIG. 6A illustrates the steps in the audit domain for an exemplary inbound push/pull transfer. FIG. 6B illustrates the system in the audit domain for an exemplary cross-server outbound transfer.

The DataHub auditing plan accomplishes the following goals:

1. Every inbound or outbound transfer is monitored.
2. Each individual step of a transfer that includes multiple data transfer steps, are independently monitored (FIG. 6B).
3. Each transfer step has the ability to track record counts, error details, suspended record details and time required for the transfer.
4. Transfers will audit data as it moves across servers (FIG. 6B).
5. An enterprise sweeper will raise alerts when a transfer fails to complete successfully (FIG. 6B).

All data transfers events are fully registered at the initiation of the transfer event in the System Audit tables in a central location in the DataHub database. This registration states the total number of steps included in this transfer.

Each transfer is configured to either accept or reject a partial transfer. A configuration that rejects a partial transfer will have to be programmed according to this configuration, i.e., the transfer will be required to retain "roll back" control of all steps of the transfer.

Every step of the transfer will be required to log transfer data associated to the transfer definition in a database that is (on a database server) accessible to that step. Each step will register the transfer starting time and expected transfer step duration at the beginning of the step. Every step will also be required to log the source and target for that step. The source and target should be fully qualified with respect to the location of the server and file or server, database and table. Upon completion, every step will be required to log the closure of the step. As such, the closure process will register the transfer ending time and the completion code. Additional information may also be registered including the source and target record count, transfer error count, transfer error details per record and suspended data records, as required by the business.

An audit sweeper will continuously check the status of each individual transfer step on all servers and update the central System Audit tables according to the status of each step. If a step does not complete successfully or does not complete in the allotted time, the monitor will raise an alert.

Error Handling

The data transfers used in the DataHub system require some basic error handling related to whether or not definitions are applicable, or if the record carries valid data or quality codes. The error handling is not intended to provide diagnostic information as to why the error is present in the record, only as an indicator that the error exists. FIG. 7A provides an exemplary list of error checks in the inbound interface for DataHub. FIG. 7B provides an exemplary list of actions based on error type.

The start of the error management process is the TransferAudit table. This table has a record setup at the start of the transfer with the start time recorded and an AuditID assigned. Statistical information is not applied to the initial record. In an exemplary embodiment, the record is setup by calling the ssp_CreateSystemAudit procedure with the TransferFlag parm set to "Y". A stored procedure having a prefix of "ssp" is used solely to support system functions, even if the functions are called by applications or interfaces. The ExtendedReferenceValue parameter is used to carry the SubscriptionID and the StartTime of the transfer (colon delimited). The returned AuditID should be carried by the interface as a batch identifier for all the records in the transfer.

The ssp_AddToTransferrErrorList stored procedure is provided to the interface as a means of registering one or more errors to a single record. A thread stamp is passed to the procedure, along with the AuditID and the particulars about the error. The thread stamp can be used to find all the errors about a particular record. A sequence number is generated for each error within the batch (1 to n). The calling interface will pass the ErrorCode and not its ID so as to simplify the development of the interface.

Records which are in an error condition should not be loaded to the Energy Data extension series tables. Instead, it should be loaded to the EnergyDataSuspended table. This table has columns that allow for identifier and attribute information for the record from both the DataHub system and from the system providing the record. The thread stamp used in the creation of the error records is assigned to the suspended record so that it can be matched to its errors.

Figure 8:
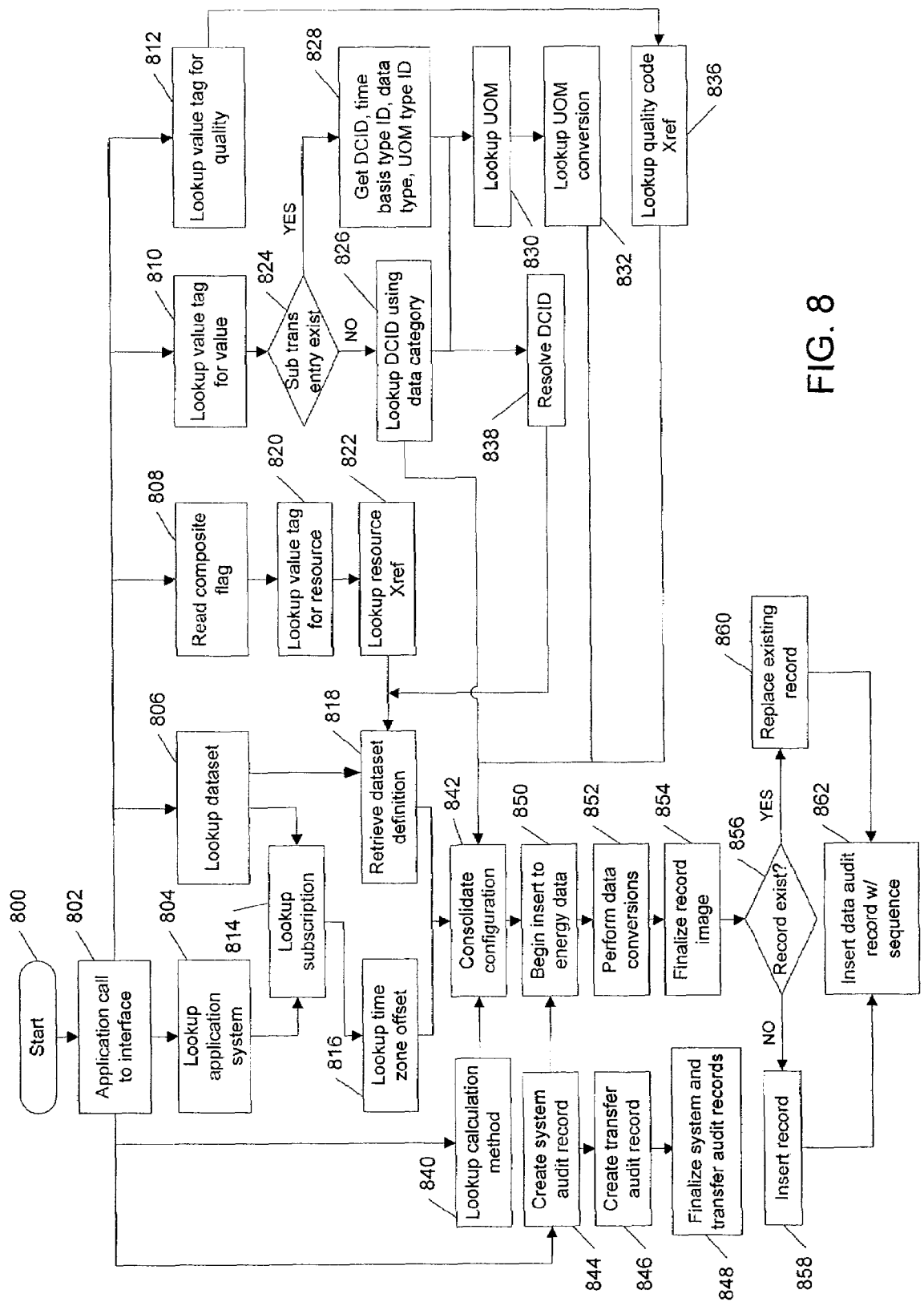
FIG. 8 illustrates processing logic for an exemplary inbound data interface in accordance with an exemplary embodiment of the invention.

FIG. 8 illustrates processing logic for an exemplary inbound data interface. Processing commences in step 800. An application places data into a staging table and then calls the DataHub inbound interface in step 802 with a plurality of parameters. During the loading of the staging table, the process bringing the data to the DataHub initiates an Audit record (in order to receive a Job ID) and does a lookup to a view to get certain pieces of information. These include matching external tags to the translation tags of the DataHub, and retrieving a Definition ID, a Resource ID, and a DataCategoryID. The parameters of the interface call include: Job ID, Subscription ID and a count of the Source Records. The interface then analyzes the configurations that were entered beforehand to determine required items, which include: system name, dataset name, application resource tag, application value tag, application value tag type, composite flag, quality code, data value, value date time, record date time and calculation method name. This data is then used, as described in the following steps, to create a resolved view of the configurations. In step 804, the system name is used to lookup the application system. If the system name is found, the system ID is input to the lookup subscription step 814. In step 806, the dataset name is used to lookup the dataset. If the dataset is found, the dataset ID is input to the lookup subscription step. Additionally, the data set ID and time series type ID are two of the inputs to the retrieve dataset definition step 818. If the subscription is found in step 814, the time zone ID is input to the lookup time zone offset step 816. Note that if any of the lookup steps illustrated in FIG. 8 fail (i.e., the item being looked up is not found), then an error processing algorithm is executed and the inbound record is suspended to a suspension table.

From the application call to interface step 802, the parameters application resource tag, application value tag, application value tag type and composite flag are input to the read composite flag step 808. If the composite flag is set to "Y", then the application value tag type is input to the lookup value tag for resource step 820. Otherwise, the application resource tag is input to step 820. The value tag ID is then input to the lookup resource cross-reference step 822. From step 822, the resource ID is another input to the retrieve dataset definition step 818.

From the application call to interface step 802, the parameters application value tag, application value tag type and composite flag are input to the lookup value tag for value step 810. From step 810, the value tag ID is an input to the subscription translation entry exist decision step 824 along with subscription ID from step 814 (a connector between steps 814 and 824 is not shown to avoid further complexity in the figure). In decision step 824, if a subscription translation entry exists, then the data category ID (DCID), time basis type ID, data type, and UOM type ID are obtained via a get operation. Otherwise, the DCID is obtained in the lookup DCID using data category step 826 by comparing the value tag code. With DCID input from either step 828 or 826, the DCID is resolved in step 838. The definition ID from step 838 is input to the retrieve dataset definition step 818. Additionally, from step 828, the UOM type ID from step 828 is input to the lookup UOM step 830, the UOM ID from step 830 is input to the lookup UOM conversion step 832. The UOM conversion factor determined in step 832 is one of several inputs to the consolidate configuration step 842.

From the application call to interface step 802, the parameter quality code is input to the lookup value tag for quality step 812. The value tag ID is then input to the quality code cross-reference step 836. The quality code ID from step 836 is another input into the consolidate configuration step 842. Also from the application call to interface step 802, the parameter calculation method type code is input to the lookup calculation method step 840. The calculation method ID is another input into the consolidate configuration step 842.

From lookup time zone offset step 816, the time zone offset is another input into the consolidate configuration step 842. The retrieve dataset definition step 818 outputs the following identifiers to the consolidate configuration step 842: resource ID, time series ID, DCID, time basis type ID, data type and UOM type ID. In step 842, the consolidated configuration includes system ID, resource ID, DCID, mapped time series, mapped time basis, mapped data type, time zone offset and quality code ID. The consolidated configuration is input to the begin insert to energy data step 850.

Additionally, from the application call to interface step 802, a system audit record is automatically created in step 844. The audit ID is another input to the begin insert to energy data step 850. The audit ID is also used to create a transfer audit record in step 846. The system and transfer audit records are finalized in step 858.

Following the begin insert to energy data step 850, data conversions are performed in step 852 based on the consolidated configuration. The conversions include a time conversion using the time basis, a date time conversion using the time zone, and data value conversions using data types and UOM. The record image is then finalized in step 854. A determination is made in decision step 856 if the record already exists. If it does, then the existing record is replaced in step 860. If it does not exist, then the new record is inserted in step 858. From either step 856 or 860, a data audit record with sequence number is inserted in step 862. The processing logic of FIG. 8 is then repeated for the next record to be inserted into the DataHub database.

Figure 9:
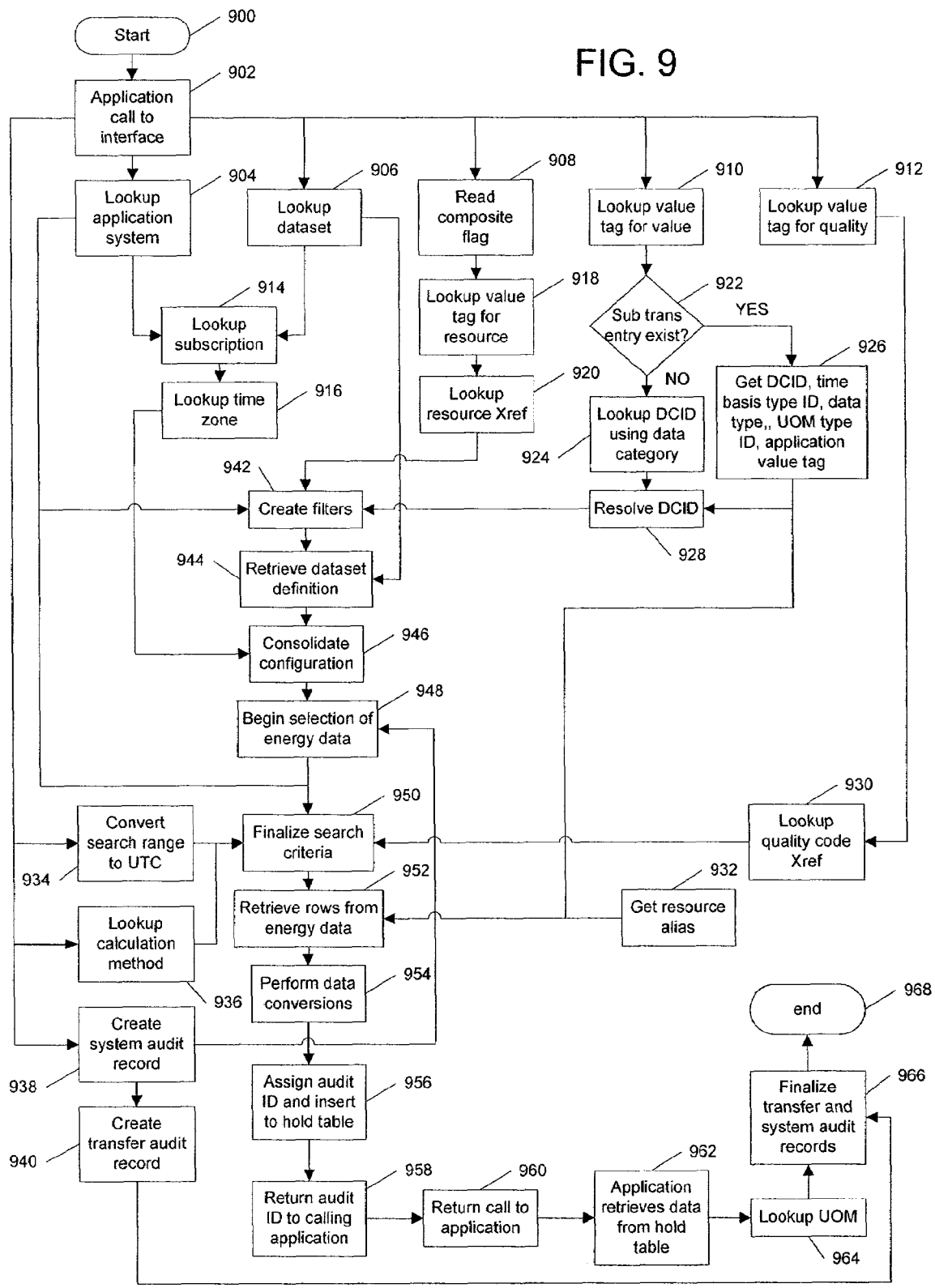
FIG. 9 illustrates processing logic for an exemplary outbound data interface in accordance with an exemplary embodiment of the invention.

FIG. 9 illustrates processing logic for an exemplary outbound data interface. Processing commences in step 900. An application calls the DataHub outbound interface in step 902 with a plurality of parameters. The parameters include: user name, system name, dataset name, source system name, date range start, date range end. In addition, flags are used to indicate the format of the desired output including: Use Standard Format, Use Application Format, Pivot Data, Use Alternate Hour, Show All Hours and Display Quality Code. In step 904, the parameter system name is used to lookup the application system. If the system name is found, the system ID is input to the lookup subscription step 914. In step 906, the dataset name is used to lookup the dataset. If the dataset is found, the dataset ID is input to the lookup subscription step. Additionally, the dataset ID is one of the inputs to the retrieve dataset definition step 944. If the subscription is found in step 914, the time zone ID is input to the lookup time zone step 916. Note that if any of the lookup steps illustrated in FIG. 9 fail (i.e., the item being looked up is not found), then an error processing algorithm is executed.

From the application call to interface step 902, the parameters application resource tag, application value tag, application value tag type and composite flag are input to the read composite flag step 908. If the composite flag is set to "Y", then the application value tag type is input to the lookup value tag for resource step 918. Otherwise, the application resource tag is input to step 918. The value tag ID is then input to the lookup resource cross-reference step 920. From step 920, the resource ID is one input to the create filters step 942.

From the application call to interface step 902, the parameters application value tag, application value tag type and composite flag are input to the lookup value tag for value step 910. From step 910, the value tag ID is an input to the subscription translation entry exist decision step 922 along with subscription ID from step 914 (a connector between steps 914 and 922 is not shown to avoid further complexity in the figure). In decision step 922, if a subscription translation entry exists, then the data category ID (DCID), time basis type ID, data type, UOM type ID and application value tag are obtained via a get operation. Otherwise, the DCID is obtained in the lookup DCID using data category step 924 by comparing the value tag code. With DCID input from either step 926 or 924, the DCID is resolved in step 928. The DCID from step 928 is input to the create filters step 942.

In the lookup application system step 904 using the source system name parameter, the source system ID that is determined is another input to the create filters step 942. The source system ID, resource ID and DCID determined in steps 904, 920 and 928, respectively, are the inputs to the create filters step 942. From the create filters step 942, the resource ID and DCID are input to the retrieve data definition step 944 along with the dataset ID from step 906.

From lookup time zone step 916, the time zone offset is another input into the consolidate configuration step 946. The retrieve dataset definition step 944 provides the following identifiers to the consolidate configuration step 946: resource ID, DCID, source system ID, time series type ID, time basis type ID, data type and UOM type ID. In step 946, the default consolidated configuration includes resource ID, DCID, time series, time basis, data type, time zone offset and source system. The consolidated configuration is input to the begin selection of energy data step 948.

Additionally, from the application call to interface step 902, a system audit record is automatically created in step 938. The audit ID is another input to the begin selection of energy data step 948. The audit ID is also used to create a transfer audit record in step 940. The system and transfer audit records are finalized in step 966.

From the application call to interface step 902, the date range start and date range end parameters are provided as inputs to convert search range to Universal Time Coordinated (UTC) step 934. From step 934, the UTC adjusted search range is provided to the finalize search criteria step 950. Also, from the application call to interface step 902, the calculation method name parameter is provided to the lookup calculation method step 936. The method ID is provided to the finalize search criteria step 950.

From the application call to interface step 902, the parameter quality code is input to the lookup value tag for quality step 912. The value tag ID is then input to the lookup quality code cross-reference step 930. The quality code ID from step 930 is another input into the finalize search criteria step 950.

The search criteria from step 950, the resource alias from step 932, and DCID, application value tag ID, time basis type ID, data type and UOM type ID from step 926 are provided to the retrieve rows from energy data step 952. Following the retrieval of rows from the energy data stored in DataHub, data conversions are performed in step 954. The conversions include a time conversion using the time basis, a date time conversion using the time zone, data value conversions using data types and UOM, and a resource tag conversion.

Following the data retrieval and conversions, the audit ID is assigned and the data is inserted into a hold table in step 956. The audit ID is returned to the calling application in step 958. The return call to the application is processed in step 960. The application then retrieves the data from the hold table in step 962. The lookup UOM step 966 is performed to determine whether or not to add to the transfer error count which is passed to the finalize transfer and system audit records step 966. Processing ends in step 968.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the spirit and scope of the present invention.

In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed is:

1. A method for organizing, managing, and accessing large quantities of data received from a plurality of non-homogenous data sources comprising the steps of:

defining a specific format for storing the received data in a plurality of data records in a centralized database;

creating a plurality of datasets including a definition and a translation for each data item, the plurality of datasets establishing the data that is transferred into or out of the centralized database;

storing the plurality of datasets in the centralized database;

creating a plurality of value tags for the centralized database defining a plurality of data formats and database column names to use in importing or exporting data;

creating an inbound interface for the centralized database for accepting data from the plurality of non-homogenous data sources wherein the data represent measured values of physical resources;

receiving a plurality of data from the plurality of non-homogenous data sources and storing the received data in the centralized database without any information loss;

creating an outbound interface for the centralized database for exporting data upon request to an external application; and providing the requested data to the external application using dynamic processing logic in the stored data.

2. The method for organizing, managing, and accessing large quantities of data of claim 1 further comprising providing the requested data to the external application in a vertical stack format.

3. The method for organizing, managing, and accessing large quantities of data of claim 1 further comprising providing the requested data to the external application in a horizontal pivot format.

4. The method for organizing, managing, and accessing large quantities of data of claim 1 wherein the dataset definition stores the data in the specific format for storing data in the centralized database.

5. The method for organizing, managing, and accessing large quantities of data of claim 1 wherein the dataset translation stores data in a format that is recognizable to the external application.

6. The method for organizing, managing, and accessing large quantities of data of claim 1 further comprising creating a plurality of filters to use in adding at least one definition to the dataset.

7. The method for organizing, managing, and accessing large quantities of data of claim 1 further comprising creating a plurality of filters to use in cross-referencing a resource and a value tag in a resource cross-reference table.

8. The method for organizing, managing, and accessing large quantities of data of claim 1 further comprising creating a plurality of subscription translation filters to isolate individual fields in a data record.

9. The method for organizing, managing, and accessing large quantities of data of claim 1 wherein the plurality of value tags comprise system/mechanism tags and aliases.

10. The method for organizing, managing, and accessing large quantities of data of claim 1 further comprising receiving a plurality of inbound data from one of the plurality of non-homogeneous data sources and storing the inbound data in a staging table.

11. The method for organizing, managing, and accessing large quantities of data of claim 10 further comprising calling the inbound interface to determine a plurality of required data items for a pre-defined configuration.

12. The method for organizing, managing, and accessing large quantities of data of claim 1 further comprising creating an audit record for tracking each data transfer into or from the centralized database.

13. The method for organizing, managing, and accessing large quantities of data of claim 12 further comprising registering the transfer in a system audit table in the centralized database.

14. The method for organizing, managing, and accessing large quantities of data of claim 12 further comprising monitoring each individual step of a transfer including multiple data transfer steps.

15. The method for organizing, managing, and accessing large quantities of data of claim 14 further comprising continuously checking a status of each individual transfer step and updating the system audit table based on the status of each step.

16. The method for organizing, managing, and accessing large quantities of data of claim 14 further comprising generating an alert if an individual transfer step does not complete in an allotted time.

17. The method for organizing, managing, and accessing large quantities of data of claim 1 further comprising creating a value tag list table including a plurality of default column name values.

18. The method for organizing, managing, and accessing large quantities of data of claim 1 further comprising establishing a data retention and archiving policy for the data records stored in the centralized database.

19. The method for organizing, managing, and accessing large quantities of data of claim 11 wherein the plurality of required data items includes at least two of a system name, a dataset name, an application resource tag, an application value tag, an application value tag type, a composite flag, a quality code, a data value, a value date time, a record date time, and a calculation method name.

20. The method for organizing, managing, and accessing large quantities of data of claim 1 further comprising setting an effective date and an end date for each data record, wherein the effective date establishes a first date that the record is accessible for storage of data and the end date establishes a last date that the record is accessible.

21. A system for organizing, managing, and accessing large quantities of data received from a plurality of non-homogenous data sources comprising:
 a centralized database;
 a processor for executing a plurality of components, including:
  a component for defining a specific format for storing the received data in a plurality of data records in a centralized database;
  a component for creating a plurality of datasets including a definition and a translation for each data item, the plurality of datasets establishing the data that is transferred into or out of the centralized database;
  a component for storing the plurality of datasets in the centralized database;
  a component for creating a plurality of value tags for the centralized database defining a plurality of data formats and database column names to use in importing or exporting data;
  a component for creating an inbound interface for the centralized database for accepting data from the plurality of non-homogenous data sources wherein the data represent measured values of physical resources; and
  a component for receiving a plurality of data from the plurality of non-homogenous data sources and storing the received data in the centralized database without any information loss;
  a component for creating an outbound interface for the centralized database for exporting data upon request to an external application; and
  a component for providing the requested data to the external application using dynamic processing logic in the stored data.

22. The system for organizing, managing, and accessing large quantities of data of claim 21 further comprising a component for providing the requested data to the external application in either a vertical stack format or a horizontal pivot format.

23. The system for organizing, managing, and accessing large quantities of data of claim 21 wherein the dataset definition stores the data in the specific format for storing data in the centralized database.

24. The system for organizing, managing, and accessing large quantities of data of claim 21 wherein the dataset translation stores data in a format that is recognizable to the external application.

25. The system for organizing, managing, and accessing large quantities of data of claim 21 further comprising a component for creating a plurality of filters to use in adding at least one definition to the dataset.

26. The system for organizing, managing, and accessing large quantities of data of claim 21 further comprising a component for creating a plurality of filters to use in cross-referencing a resource and a value tag in a resource cross-reference table.

27. The system for organizing, managing, and accessing large quantities of data of claim 21 further comprising a component for creating a plurality of subscription translation filters to isolate individual fields in a data record.

28. The system for organizing, managing, and accessing large quantities of data of claim 21 wherein the plurality of value tags comprise system/mechanism tags and aliases.

29. The system for organizing, managing, and accessing large quantities of data of claim 21 further comprising a component for receiving a plurality of inbound data from one of the plurality of non-homogeneous data sources and storing the inbound data in a staging table.

30. The system for organizing, managing, and accessing large quantities of data of claim 29 further comprising a component for calling the inbound interface to determine a plurality of required data items for a pre-defined configuration.

31. The system for organizing, managing, and accessing large quantities of data of claim 21 further comprising:
 a component for creating an audit record for tracking each data transfer into or from the centralized database;
 a component for registering the data transfer in a system audit table in the centralized database;
 a component for monitoring each individual step of the data transfer including multiple data transfer steps;
 a component for continuously checking a status of each individual data transfer step and updating the system audit table based on the status of each step; and
 a component for generating an alert if an individual transfer step does not complete in an allotted time.

32. The system for organizing, managing, and accessing large quantities of data of claim 21 further comprising a component for creating a value tag list table including a plurality of default column name values.

33. The system for organizing, managing, and accessing large quantities of data of claim 21 further comprising a component for establishing a data retention and archiving policy for the data records stored in the centralized database.

34. The system for organizing, managing, and accessing large quantities of data of claim 21 wherein the plurality of required data items includes at least two of a system name, a dataset name, an application resource tag, an application value tag, an application value tag type, a composite flag, a quality code, a data value, a value date time, a record date time, and a calculation method name.

35. The system for organizing, managing, and accessing large quantities of data of claim 21 further comprising a component for setting an effective date and an end date for each data record, wherein the effective date establishes a first date that the record is accessible for storage of data and the end date establishes a last date that the record is accessible.

36. A computer readable storage media containing instructions for controlling a computer system to organize, manage, and access large quantities of data received from a plurality of non-homogenous data sources, by:
- defining a specific format for storing the received data in a plurality of data records in a centralized database;
- creating a plurality of datasets including a definition and a translation for each data item, the plurality of datasets establishing the data that is transferred into or out of the centralized database;
- storing the plurality of datasets in the centralized database;
- creating a plurality of value tags for the centralized database defining a plurality of data formats and database column names to use in importing or exporting data;
- creating an inbound interface for the centralized database for accepting data from the plurality of non-homogenous data sources wherein the data represent measured values of physical resources;
- receiving a plurality of data from the plurality of non-homogenous data sources and storing the received data in the centralized database without any information loss;
- creating an outbound interface for the centralized database for exporting data upon request to an external application; and
- providing the requested data to the external application using dynamic processing logic in the stored data.

37. The computer readable storage media containing instructions for controlling a computer system to organize, manage, and access large quantities of Elate data of claim 36 by providing the requested data to the external application in a vertical stack format or a horizontal pivot format.

38. The computer readable storage media containing instructions for controlling a computer system to organize, manage, and access large quantities of data of claim 36 by creating a plurality of filters to use in adding at least one definition to the dataset.

39. The computer readable storage media containing instructions for controlling a computer system to organize, manage, and access large quantities of data of claim 36 by creating a plurality of filters to use in cross-referencing a resource and a value tag in a resource cross-reference table.

40. The computer readable storage media containing instructions for controlling a computer system to organize, manage, and access large quantities of data of claim 36 by creating a plurality of subscription translation filters to isolate individual fields in a data record.

41. The computer readable storage media containing instructions for controlling a computer system to organize, manage, and access large quantities of data of claim 36 by receiving a plurality of inbound data from one of the plurality of non-homogeneous data sources and storing the inbound data in a staging table.

42. The computer readable storage media containing instructions for controlling a computer system to organize, manage, and access large quantities of data of claim 36 by calling the inbound interface to determine a plurality of required data items for a pre-defined configuration.

43. The computer readable storage media containing instructions for controlling a computer system to organize, manage, and access large quantities of data of claim 36 further comprising establishing a data retention and archiving policy for the data records stored in the centralized database.

44. The computer readable storage media containing instructions for controlling a computer system to organize, manage, and access large quantities of data of claim 42 wherein the plurality of required data items includes at least two of a system name, a dataset name, an application resource tag, an application value tag, an application value tag type, a composite flag, a quality code, a data value, a value date time, a record date time, and a calculation method name.

* * * * *